United States Patent [19]

Hatwar et al.

[11] Patent Number: 4,992,338
[45] Date of Patent: Feb. 12, 1991

[54] MULTILAYER MAGNETOOPTIC RECORDING MEDIUM WITH A POLARIZABLE PALLADIUM INTERMEDIATE LAYER

[75] Inventors: Tukaram K. Hatwar, Rochester; Douglas G. Stinson, Fairport, both of N.Y.

[73] Assignee: Eastman Kodak Company, Rochester, N.Y.

[21] Appl. No.: 488,166

[22] Filed: Mar. 5, 1990

[51] Int. Cl.$^5$ .............................................. G11B 11/00
[52] U.S. Cl. ..................................... 428/694; 428/900
[58] Field of Search ............... 428/694, 900; 360/131, 360/135; 365/122; 369/13, 14

[56] References Cited

U.S. PATENT DOCUMENTS 4,559,573 12/1985 Tanaka et al. ...................... 428/900
4,789,606 12/1988 Yamada et al. ..................... 428/694

FOREIGN PATENT DOCUMENTS 258978 3/1988 European Pat. Off. .
282356 9/1988 European Pat. Off. .
291234 11/1988 Japan .

Primary Examiner—George F. Lesmes
Assistant Examiner—Dennis V. Carmen
Attorney, Agent, or Firm—Warren W. Kurz

[57] ABSTRACT

A multilayer, direct-overwrite, magneto-optic recording elment comprises first and second layers of magnetic materials having different magnetic coercivities and Curie temperatures. Such layers are spaced apart by an intermediate layer comprising a readily polarizable non-magnetic metal. The intermediate layer serves to control the degree of magnetic exchange interaction between the magnetic layers, and prevents the constituents of the magnetic layers from diffusing between such layers.

6 Claims, 3 Drawing Sheets

MULTILAYER MAGNETOOPTIC RECORDING MEDIUM WITH A POLARIZABLE PALLADIUM INTERMEDIATE LAYER

BACKGROUND OF THE INVENTION

The present invention relates to the field of magneto-optic recording. More particularly, it relates to improvements in magneto-optic recording elements of the type having a direct-overwrite capability.

Conventional magneto-optic disks require two revolutions of the disk to record information. The first revolution is used to erase any previously recorded information, while the second revolution is used to record the new information. The information is stored as patterns of vertically oriented magnetic domains arranged along an annular track on the magneto-optic disk. Traditional magnetic recording systems have a direct-overwrite capability in that erasure of previously recorded information is intrinsic in the recording process. Hence, magnetic systems require only one revolution to record data. As a consequence, compared to magnetic disks, magneto-optic disks are disadvantageous from the standpoint of requiring a substantially longer effective access time.

In U.S. Pat. No. 4,882,718 to Sheih and Kryder, a method is disclosed for eliminating the above-noted two-revolution requirement. Here, the recording element comprises a single magnetic recording layer, and a laser is switched between two power levels according to the digital information being recorded. The lower power level raises the temperature of the recording layer to a level sufficient to destabilize and collapse existing magnetic domains; this has the effect of erasing existing information. The higher power level acts upon the recording layer to create new domains according to the information being recorded. While theoretically plausible as a solution to the two-revolution requirement, experimental evidence indicates that this process results in poorly formed domains and, hence, a low signal-to-noise (SNR) ratio.

In U.S. Pat. No. 4,855,975 to Saito et al, an alternative technique is described for eliminating the noted two-revolution requirement. Here, the recording element comprises two different magnetic layers or films laminated together. One layer, the reference layer, has a low room-temperature coercivity $H_{c(ref.)}$ and a high Curie temperature $T_{c(ref.)}$. The other layer, the so-called memory layer, has a high room-temperature coercivity $H_{c(mem.)}$ and a low Curie temperature $T_{c(mem.)}$. As the disk shaped recording element rotates, the disk passes in close proximity to an initialization magnet, thereby exposing the disk to a field $-H_i$ perpendicular to the disk surface, where $H_{c(mem.)} > H_i > H_{c(ref.)}$. This initialization field serves to vertically orient all magnetic domains of the reference layer in the a given direction (e.g. "down") but has no effect on the memory layer. A second magnet, the bias magnet, is arranged to expose the area of the disk which is selectively heated by an intensity-modulated laser to a field $H_b$, where $H_{c(mem.)} > H_{c(ref.)} > H_b$. The bias field $H_b$ is perpendicular to the disk and directed in the direction opposite to that of $-H_i$. While the disk is being read, $H_b$ has no effect on either layer.

When the above-described disk is exposed to a certain power of laser light, the memory layer will be heated above its Curie temperature, while the reference layer remains below its Curie temperature. Under these conditions, the magnetic exchange interaction which exists between the two layers will cause the magnetization of the memory layer to be aligned with the magnetization of the reference layer. Whenever the disk is selectively exposed to a higher light power, both layers become heated to temperatures above their respective Curie temperatures, and the magnetization of the heated portions of both layers become realigned in the direction of the bias field $H_b$, i.e., the field produced by the bias magnet. Consequently, by modulating the laser light intensity between these two power levels, digital information can be recorded while simultaneously erasing any pre-existing information.

As noted above, the exchange interaction between the two magnetic layers serves to align the magnetization of both layers. Beginning with the magnetization of the layers aligned, an applied magnetic field must overcome the coercivity of one of the layers plus the exchange force to cause them to be aligned antiparallel. Similarly, starting with the magnetic domains of the respective layers oppositely aligned, an applied field must overcome the coercivity of one layer less the exchange force to cause the layers to be aligned parallel. Unfortunately, the exchange interaction has the effect of causing the apparent coercivities of the two layers to converge, making it difficult, at best, to switch one film independently of the other, as required by this direct-overwrite scheme. An alternative view of this observed effect is that a domain wall must form between the two layers wherever their magnetization is oppositely aligned. The energy stored in this wall makes it unfavorable for the layers to switch independently.

To mitigate the above-identified problem, it has been proposed that a layer of gadolinium-iron-cobalt (GdFeCo) be positioned between the memory and referenced layers. The exchange interaction is now mediated through this intermediate layer. This intermediate layer has little intrinsic anisotropy as opposed to the strong perpendicular anisotropy of the two magnetic layers. Both of these conditions lower the energy of the state where the magnetization of the reference layer is antiparallel to that of the memory layer. This makes it easier to obtain the balance between sufficient coupling to cause the layers to align during the lower power write step and allowing the initialization magnet to switch only the reference layer. Such a multilayered recording element is disclosed in European Patent Application No. 319,004, published June 7, 1989.

In both of the multilayer direct-overwrite magneto-optic recording elements described above, the various layers are comprised of similar materials, but with different concentrations of components. In this situation, components from one layer may diffuse into the adjacent layer. This diffusion is accelerated by the temperature excursions which the magneto-optic layers undergo during each write/erase cycle. Diffusion, over time, will change the magnetic properties of the layers, eventually rendering direct-overwrite impossible. Moreover, the proposed recording elements use rare-earth-transition metal alloys which are highly susceptible to corrosion.

SUMMARY OF THE INVENTION

In view of the foregoing, an object of this invention is to provide a multilayer magneto-optic recording element in which the above-noted diffusion problem is substantially eliminated.

Like the multilayer magneto-optic recording elements of the prior art, the recording element of the invention comprises reference and memory layers made of magnetic materials having different Curie temperatures and magnetic coercivities, and an intermediate layer which serves to control the degree of exchange interaction between the reference and memory layers by maintaining the respective coercivities of these layers at substantially different values. Unlike the prior art, however, the intermediate layer of the magneto-optic recording element of the invention comprises a readily polarization metal which, while exhibiting no magnetic moment, exhibits an induced magnetic moment when positioned in close proximity to the magnetic materials constituting the reference and memory layers. Preferred polarizable metals include palladium (Pd), vanadium (V) and platinum (Pt), with palladium being particularly preferred. Not being composed of any of the chemical constituents of the reference and memory layers, such intermediate layer acts as a diffusion barrier to prevent the problems identified above. Also, direct contact by such polarizable metal intermediate layer with the magnetic layers of the recording element inhibits corrosion of these layers, which typically comprise readily corrodable rare earth-transition metal alloy films.

The invention and its various advantages will become better understood by those skilled in the art from the ensuing detailed description of preferred embodiments, reference being made to the accompanying drawings.

DETAILED DESCRIPTION OF PREFERRED EMBODIMENTS

Figure 1:
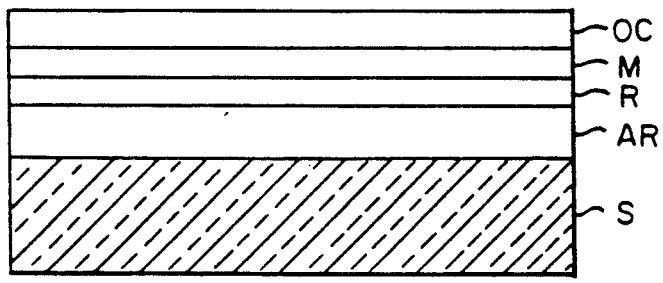
FIGS. 1 and 1A are cross-sectional illustrations of conventional multilayer magneto-optic recording elements.

Referring now to the drawings, FIG. 1 illustrates a multilayer magneto-optic (MO) recording element of the type disclosed in the above-mentioned patent to Saito et al. Such recording element comprises a relatively thick transparent substrate S having an antireflection coating AR (e.g. a thin-film of aluminum-nitride (AlN)) disposed on one of its planar surfaces. Atop the antireflection coating are a pair of contiguous magnetic recording layers, R and M, comprised of different magnetic materials exhibiting vertical anisotropy. Layer M, referred to as the "memory" layer, may comprise, for example, a thin-film (e.g. 500 Angstroms thick) of terbium-iron (TeFe), whereas layer R, referred to a the "reference" layer, may comprise a comparably thick thin-film of terbium-iron-cobalt (TeFeCo). The addition of cobalt to the reference layer has the effect of increasing the Curie temperature of this layer relative to that of the memory layer. Different concentrations of terbium in each layer serves to increase the coercivity of the memory layer relative to the reference layer. A thin-film (e.g. 1100 Angstroms) of aluminum-nitride (AlN) or the like forms a protective overcoat OC atop the memory layer. Writing and direct-overwriting of digital information on such a recording element is achieved in the manner described above.

Figure 2A:
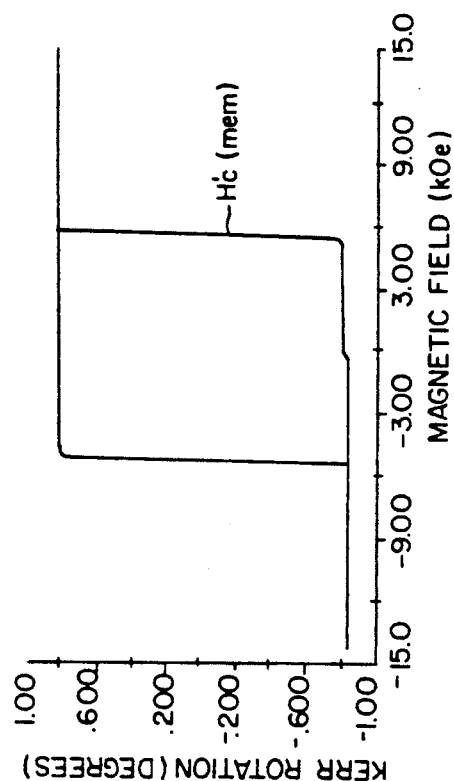
FIGS. 2A-2D illustrate hysterisis loops of different magneto-optic materials before and after being incorporated in the recording element of FIG. 1.
Figure 2C:
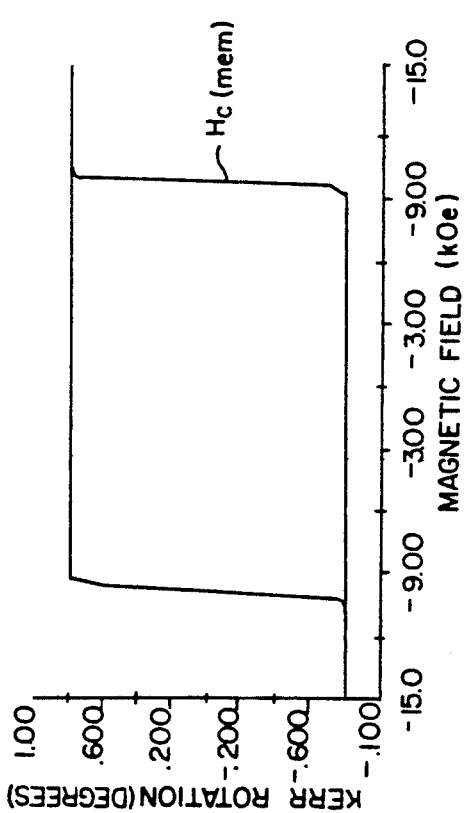
Figure 2B:
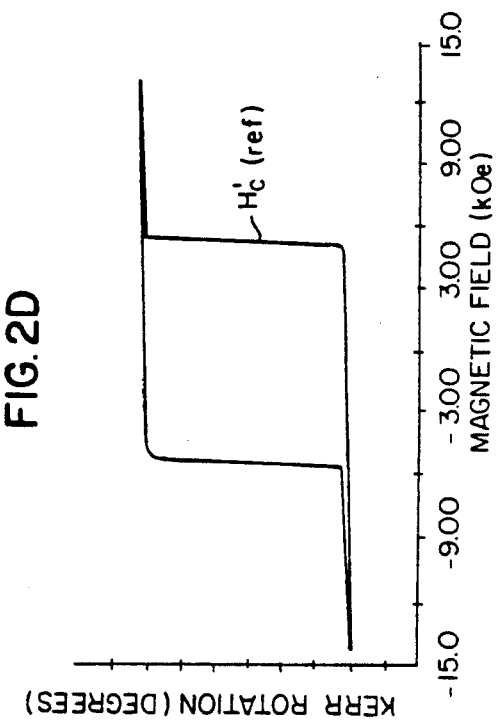
Figure 2D:
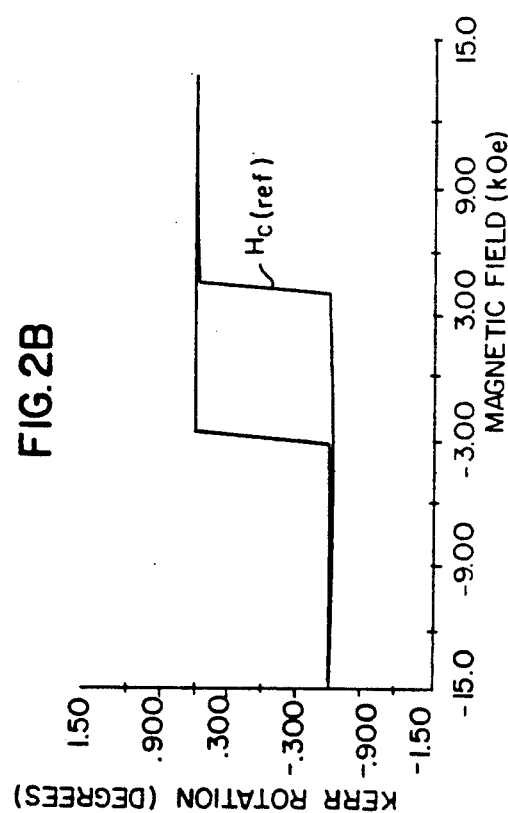

Referring to the hysterisis loops shown in FIGS. 2A and 2B, it will be seen that the magnetic coercivity of the memory layer material is $H_{c(mem.)}$, substantially greater than the coercivity, of the reference layer material $H_{c(ref.)}$. Such a coercivity difference is required, of course, by the aforementioned recording method described by Saito et al. But, referring to FIGS. 2C and 2D, it will be seen that the respective "apparent" coercivities of the memory and reference materials (i.e., $H_{c(mem.)}$ and $H_{c(ref.)}$) are substantially identical when deployed in contiguously arranged layers. As noted above, the exchange interaction between contiguous layers has the effect of causing the apparent coercivities of these materials to converge to the same value. Such "apparent" coercivities of the memory and reference layers of a multilayer recording element can be readily measured through the substrate and through the overcoat by using the Kerr effect.

In FIG. 2A there is illustrated another prior art magneto-optic recording element in which an intermediate layer IL is arranged between the reference and memory layers of the FIG. 1 recording element. The FIG. 1A recording element is basically that disclosed in the above-mentioned Arantani et al patent. The purpose of the intermediate layer is to mediate the magnetic exchange interaction between the reference and memory layers and, as already mentioned above, layer IL itself has little intrinsic anisotropy, compared to that of the reference and memory layers. In the Arantani et al recording element, the intermediate layer is composed of some of the same components (e.g., Fe and Co) as those which comprise the reference and memory layers; hence, there is a tendency for these components to diffuse with time, thereby changing the stoiciometry of all these layers. The effect of such diffusion is to cause the respective coercivities and Curie temperatures of the memory and reference layers to converge toward common nominal values.

Figure 1A:
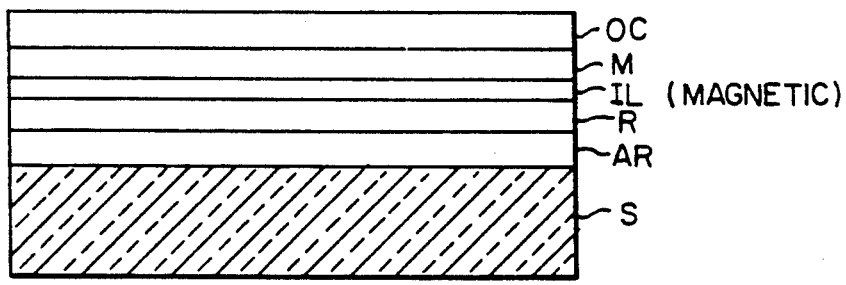

According to the present invention, it has been found that readily polarizable non-magnetic metals can be used as the intermediate layer IL of the FIG. 1A recording element to control the exchange interaction between the memory and reference layers. Preferred materials are metals having electronic structures similar to those of the ferromagnetic metals, examples being palladium, platinum, vanadium, and alloys of such metals. These metals have no magnetic moment by themselves, but a moment is induced on them when they are in proximity to a magnetic material. This induced magnetic moment is used to mediate the exchange interaction between the memory and reference layers. These materials will not diffuse into the memory and reference layers and, in fact, have been used as diffusion barrier layers in other products. This invention makes use of both properties of these materials, i.e., being diffusion resistant and magnetically polarizable.

Figure 3:
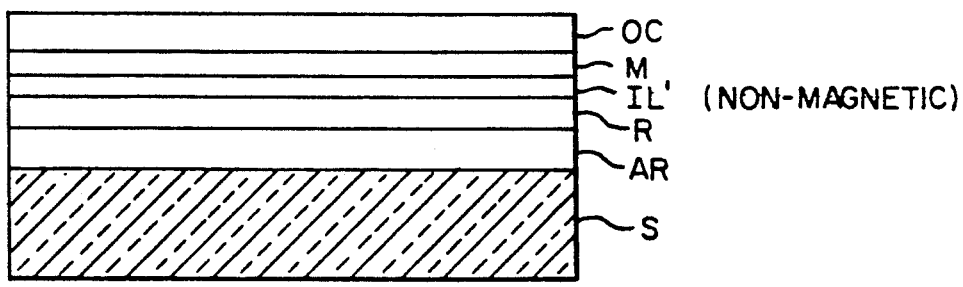
FIG. 3 is cross-sectional illustrations of the magneto-optic recording element of the invention.
Figure 4:
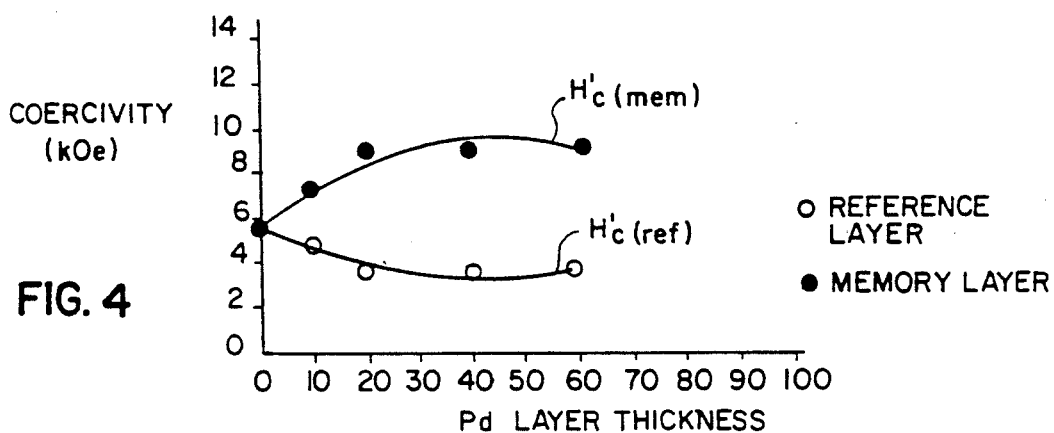
FIG. 4 is a graph illustrating the variation in the respective coercivities of the reference and memory layers of a multilayer recording element as a function of intermediate layer thickness.

A series of magneto-optic recording elements were prepared, each having a cross-section as shown in FIG. 3, and each having a different thickness of a palladium intermediate layer IL'. Conventional sputtering techniques were used to deposit all layers. A plot of the coercivity of the reference and memory layers as a function of the palladium thickness is shown in FIG. 4. As is apparent, the degree of exchange interaction can be controlled by varying the thickness of the palladium layer.

Figure 5:
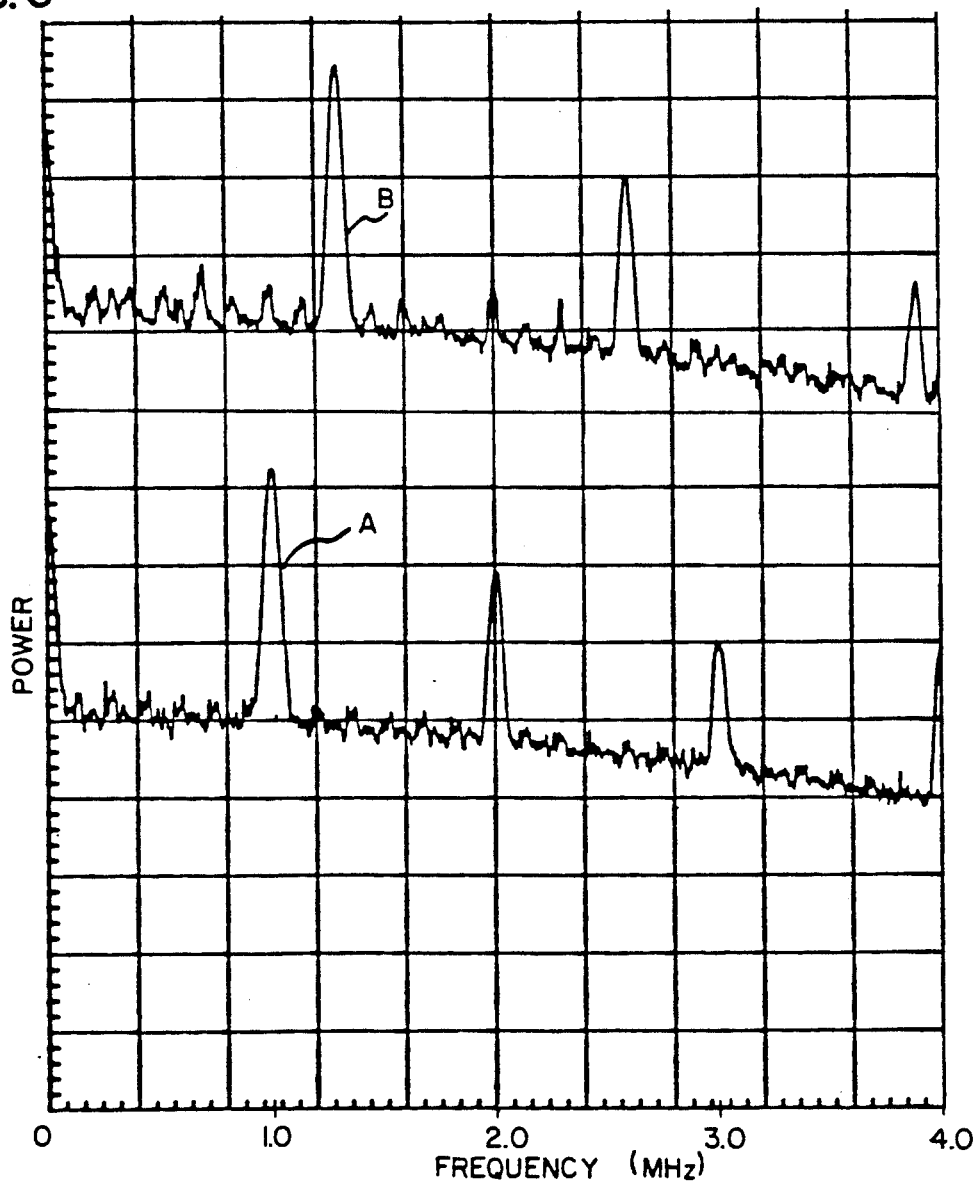
FIG. 5 presents spectrum analyses illustrating the direct-overwrite capability of the magneto-optic recording element of the invention.

A recording element having a 20 Angstrom thick palladium intermediate layer was tested for its direct-overwrite capability by using an initialization magnetic field $H_i$ of 7000 Oersteds, and a writing bias field, $H_b$, of 100 Oersteds. The power of the writing laser beam was switched between 4.9 and 10.0 milliwatts. A track was written while modulating the laser power at a frequency of 1.0 MHz. The spectrum of the recovered signal is shown as curve A in FIG. 5. Thereafter, the same track was overwritten while modulating the laser power at a frequency of 1.3 MHz. The spectrum of the recovered signal is shown as curve B in FIG. 5. The first and second harmonics, as expected, are shown in curves A and B. As is apparent from curve B, there is no evidence of any degradation in the spectrum of the 1.3 MHz signal as a result of the previously written 1.0 MHz signal. This demonstrates that the recording element can be directly-overwritten without requiring an intermediate erase cycle. Owing to the diffusion barrier provided by the palladium layer, the coercivity and Curie temperature differentials between the reference and memory layers will be maintained for a long time interval, thereby providing a long-lasting overwrite capability.

Rather than using a relatively pure layer of palladium or the other non-magnetic metals mentioned above as the intermediate layer, alloys of such metals may also be used where the major component of the alloy consists of such metals. Such alloy layers can be sputter deposited in a known manner. e.g., according to the process disclosed in the commonly assigned U.S. Pat. No. 4,885,134.

The invention has been described in detail with particular reference to certain preferred embodiments thereof, but it will be understood that variations and modifications can be effected within the spirit and scope of the invention.

We claim:

1. A direct-overwrite magneto-optic recording element comprising first and second layers of magnetic material having different coercivities and Curie temperatures, said layers being spaced apart by a contiguous intermediate layer consisting essentially of palladium.

2. The recording element as defined by claim 1 wherein said intermediate layer has a thickness of at least 15 Angstroms.

3. The recording element as defined by claim 1 wherein each of said layers of magnetic material has a thickness of at least 400 Angstroms.

4. A direct-overwrite magneto-optic recording element comprising a transparent substrate, an anti-reflection layer disposed on said substrate, a first magnetic layer disposed on said anti-reflection layer, a polarizable, non-magnetic layer consisting essentially of palladium disposed on said first magnetic layer, and a second magnetic layer disposed on said non-magnetic layer, said first and second magnetic layers having different magnetic coercivities and Curie temperatures.

5. The recording element as defined by claim 4 wherein said polarizable non-magnetic layer has a thickness of at least 15 Angstroms.

6. The recording element as defined by claim 5 wherein each of said magnetic layers has a thickness of at least 400 Angstroms.

* * * * *